United States Patent
Imazeki et al.

(10) Patent No.: US 6,673,482 B2
(45) Date of Patent: Jan. 6, 2004

(54) COOLING SYSTEM FOR FUEL CELL

(75) Inventors: Mitsuharu Imazeki, Wako (JP); Takeshi Ushio, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 147 days.

(21) Appl. No.: 09/966,606

(22) Filed: Sep. 27, 2001

(65) Prior Publication Data

US 2002/0037447 A1 Mar. 28, 2002

(30) Foreign Application Priority Data

Sep. 27, 2000 (JP) .................................... 2000-294876

(51) Int. Cl.[7] .......................... H01M 8/04; G05D 23/00
(52) U.S. Cl. ............................. 429/26; 429/22; 429/24; 165/287
(58) Field of Search ............................ 429/26, 20, 24, 429/22, 120; 165/201, 287

(56) References Cited

U.S. PATENT DOCUMENTS

2001/0050191 A1 * 12/2001 Ogawa et al. .............. 180/65.3

2002/0025466 A1 * 2/2002 Mueller et al. .............. 429/26

FOREIGN PATENT DOCUMENTS

JP          06-176787    *  6/1994  ............. H01M/8/04

* cited by examiner

Primary Examiner—Stephen Kalafut
Assistant Examiner—R Alejandro
(74) Attorney, Agent, or Firm—Lahive & Cockfield, LLP

(57) ABSTRACT

A cooling system for a fuel cell includes a heat exchanger for cooling coolant discharged from the fuel cell and a heat regulator for adjusting a temperature of coolant to be supplied to the fuel cell after mixing coolant that has been cooled by the heat exchanger with coolant that has bypassed the heat exchanger together. The cooling system also includes an ion exchanger for removing ions from the coolant with the use of ion exchange resin, and a supply control means for controlling coolant to be supplied to the ion exchanger. The supply control means supplies the ion exchanger with coolant that has bypassed the heat exchanger when the heat regulator operates beyond a coolant temperature adjustable range, and the supply control means supplies the ion exchanger with coolant that has been cooled by the heat exchanger when the heat regulator operates within the coolant temperature adjustable range.

14 Claims, 4 Drawing Sheets

COOLING SYSTEM FOR FUEL CELL

FIELD OF THE INVENTION

The present invention relates to a cooling system for a fuel cell, and more particularly, to a cooling system equipped with an ion exchanger for removing ions from coolant.

PRIOR ART

Recently, the polymer electrolyte membrane fuel cell has drawn attention as a power source of an electric vehicle etc., because of its cleanness and excellent energy efficiency. Such a fuel cell is a kind of generator which electrochemically generates electricity with the supply of fuel gas (hydrogen) and oxidant gas (air). The temperature of the fuel cell increases when the fuel cell generates electricity.

Polymer electrolyte membrane fuel cell has an optimum operating temperature range, and a predetermined temperature of coolant (approximately 70° C.) is supplied to operate the fuel cell within the optimum temperature range (approximately 85° C.).

Meanwhile, when ion exchange resin is thermally decomposed, substance yielded in the thermal decomposition deteriorates conductivity. The control temperature of the fuel cell, i.e. the control temperature of coolant to be supplied to the fuel cell, is higher (e.g., 70±2° C.) than the temperature (heat resistance temperature of the ion exchange resin) at which the ion exchange resin can be operated for a long period of time under favorable conditions. Supplying high temperature coolant to the ion exchanger will result in a deterioration of the ion exchange resin. Therefore, low temperature coolant is supplied to the ion exchanger. The ion exchanger also requires more than a predetermined amount of coolant to be continuously flowed through the ion exchanger for the purpose of controlling the conductivity.

A conventional cooling system 50 for a fuel cell is shown in FIG. 4. The cooling system 50 includes a first cooling passage (cooling passage) 51 for circulating and feeding first coolant (coolant) to the fuel cell FC. Provided along the first cooling passage 51 are a first circulating pump 53, a heat exchanger 58, a bypass line 51A bypassing the heat exchanger 58, and a heat regulator (thermostat valve) 54 by which cold coolant (approximately 60° C.) flowing through the heat exchanger 58 and warm coolant (approximately 80° C.) flowing through the bypass line 51A are mixed so that the temperature of a first coolant is adjusted. By this arrangement of the cooling system 50, the first coolant (coolant) that is adjusted at the temperature of 70±2° C. by the heat regulator 54 can be supplied to the fuel cell FC.

In order to keep the conductivity of the first coolant lower, the cooling system 50 is arranged such that a part of the cold first coolant flowing through the heat exchanger 58 flows into the ion exchanger 55 to remove ions and then returns to the intake side of the first circulating pump 53. In this figure, reference numeral 51B denotes a supply line for supplying the ion exchanger 55 with the first coolant that has flowed through the heat exchanger 58, and reference numeral 51C denotes a return line for returning the first coolant to the first cooling passage 51 after the ion exchanger 55 removes ions from the first coolant. Further, reference numeral 52 denotes a second cooling passage 52 for cooling the first cooling passage 51, reference numeral 56 denotes a secondary circulating pump, and reference numeral 57 denotes a radiator for cooling the second cooling passage 52.

In this arrangement of the cooling system 50, it is possible to constantly supply the ion exchanger 55 with cold first coolant that has flowed through the heat exchanger 58, when compared with the arrangement where first coolant is supplied to the ion exchanger 55 from the downstream of the heat regulator 54 after warm first coolant and cold first coolant are mixed together and the temperature of the mixed first coolant is adjusted.

SUMMARY OF THE INVENTION

In the conventional cooling system 50 where a part of the first coolant (coolant) is separated from the upstream of the heat regulator 54, if the temperature of the first cooling passage 51 increases entirely due to an increased load of the fuel cell FC (and/or deteriorated performance of the heat exchanger 58), cold first coolant to be supplied to the heat regulator 54 becomes insufficient. Therefore, the heat regulator 54 performs temperature adjustment beyond its threshold limit, which makes it impossible for the cooling system 50 to supply the fuel cell FC with first coolant that has been adjusted to a proper temperature. Especially, when the fuel cell FC is used under conditions of rapid load changes, such as in the case where the fuel cell FC is mounted on an electric vehicle, such a problem would occur frequently. It may be possible to return first coolant that has flowed through the ion exchanger 55 to the downstream of the heat regulator 54. However, in terms of controlling temperature, it is not preferable that first coolant whose temperature has been adjusted by the heat regulator 54 is mixed with first coolant whose temperature has not been adjusted.

In view of the above, the primary object of the present invention is to provide a cooling system for a fuel cell, which can smoothly adjust the temperature of coolant, and which can supply an ion exchanger with a sufficient amount of coolant at temperatures as low as possible, to thereby drive the fuel cell under favorable conditions.

According to a first aspect of the present invention, a cooling system for a fuel cell includes: a heat exchanger which cools coolant discharged from the fuel cell; a heat regulator which adjusts a temperature of coolant to be supplied to the fuel cell after mixing coolant that has been cooled by the heat exchanger and coolant that has bypassed the heat exchanger together; an ion exchanger which removes ions from coolant with the use of ion exchange resin; and a supply control means which controls coolant to be supplied to the ion exchanger. The supply control means supplies the ion exchanger with coolant from a downstream of the heat regulator when the heat regulator operates beyond a coolant temperature adjustable range, and the supply control means supplies the ion exchanger with coolant that has been cooled by the heat exchanger from an upstream of the heat regulator when the heat regulator operates within the coolant temperature adjustable range.

In this construction of the cooling system, when the heat regulator operates within the coolant temperature adjustable range (controllable range), the supply control means supplies the ion exchanger with coolant (flowing through the heat exchanger) from the upstream of the heat regulator, so as to prevent the ion exchanger from being deteriorated by heat. When the heat regulator operates beyond the coolant temperature adjustable range (controllable range), the supply control means supplies the ion exchanger with coolant from the downstream of the heat regulator, so that the temperature adjustment can be performed reliably at the heat regulator without deficiency of the supply of coolant flowing through the heat exchanger. Because temperature adjustment has already been applied to coolant flowing downstream of the heat regulator, a part of the coolant can be taken out from the downstream of the heat regulator without affecting the heat regulator. To be more specific, cold coolant is supplied to the ion exchanger from the upstream of the heat regulator when the heat regulator operates within the temperature adjustable range, and a supply of cold coolant from the upstream of the heat regulator is stopped when the heat regulator operates beyond the temperature adjustable range. Therefore, temperature adjustment of the coolant can be performed in a reliable manner, and coolant at a temperature as low (cold) as possible can be supplied to the ion exchanger.

The supply control means described in the preferred embodiment includes two solenoid valves and the like, and when one of the two solenoid valves allows a flow of coolant, the other solenoid valve shuts off a flow of coolant.

The aforementioned cooling system may have a temperature detector which detects the temperature of coolant to be supplied to the fuel cell. Further, the supply control means supplies the ion exchanger with coolant that has bypassed the heat exchanger when the temperature of the coolant is equal to or lower than a predetermined temperature, and the supply control means supplies the ion exchanger with coolant that has been cooled by the heat exchanger when the temperature of the coolant is higher than the predetermined temperature.

In this construction of the cooling system, by detecting the temperature of coolant to be supplied to the fuel cell, it is possible to adjust the temperature of the coolant in a more reliable manner.

DETAILED DESCRIPTION OF THE PREFERRED EMBODIMENT

One preferred embodiment of the present invention will be described below with reference to the accompanying drawings.

Figure 1:
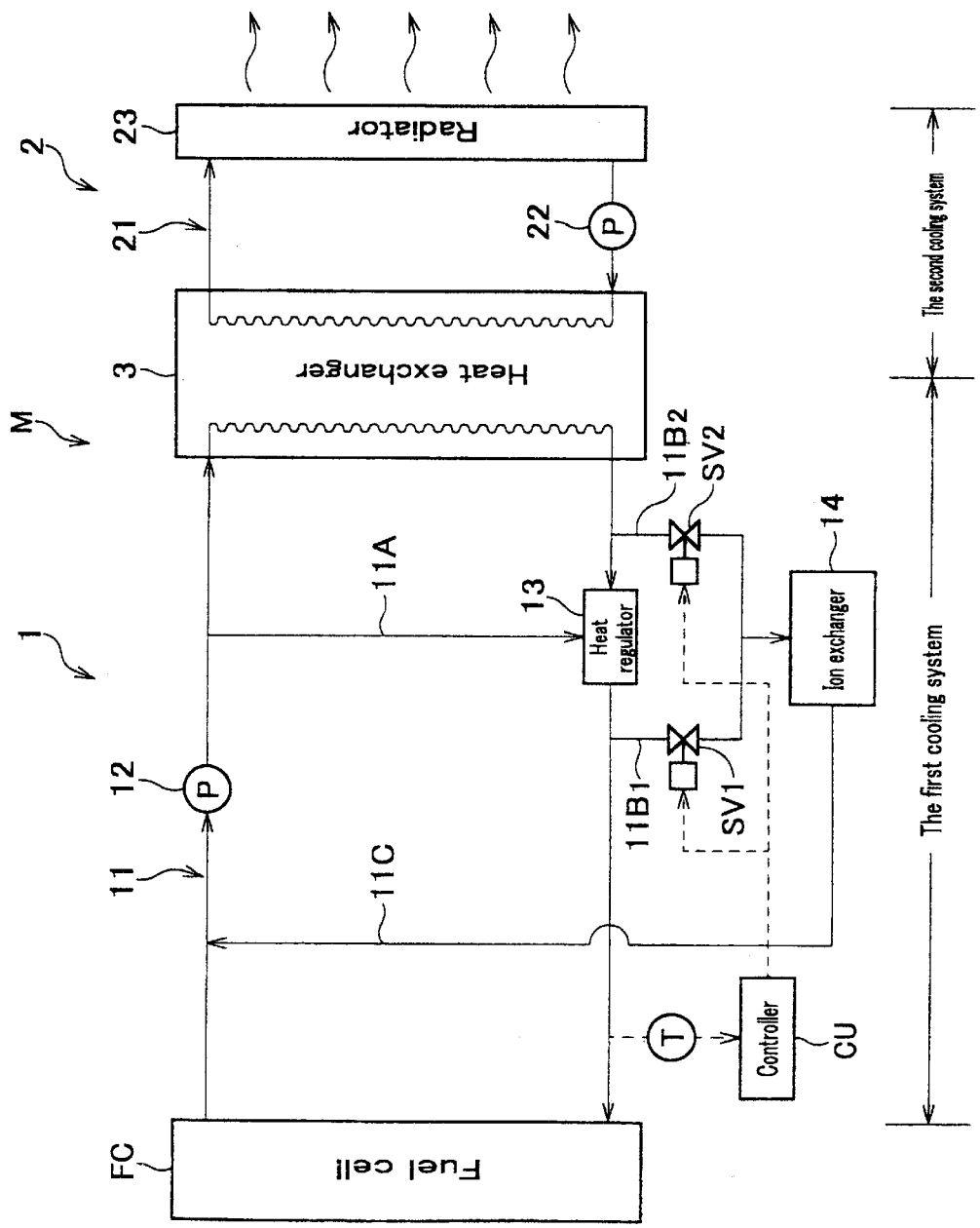
FIG. 1 is a block diagram illustrating the structure of a cooling system for a fuel cell according to one embodiment of the present invention.

As shown in FIG. 1, a cooling system M for a fuel cell FC includes a first cooling passage 1 through which first coolant for cooling the fuel cell FC circulates, and a second cooling passage 2 through which second coolant for cooling the first coolant circulates.

First Cooling Passage

A first circulating passage 11 for circulating and supplying coolant to the fuel cell FC is formed in the first cooling passage 1. This first circulating passage 11 is equipped with a first circulating pump 12 for circulating first coolant, a heat exchanger 3 provided downstream of the first circulating pump 12 and for cooling the first cooling passage 1 (first coolant), a bypass line 11A provided downstream of the first circulating pump 12 and bypassing the heat exchanger 3, and a heat regulator 13 for adjusting the temperature of coolant after mixing cold first coolant that has flowed through the heat exchanger 3 and warm first coolant that has flowed through the bypass line 11A.

In this preferred embodiment, the heat regulator 13 is a thermostat value. The heat regulator 13 has a structure shown in FIG. 2(a) and FIG. 2(b). For circulating first coolant, a main passage 13A and a bypass passage 13B are provided inside of the heat regulator 13. The heat regulator 13 has an element 13C. Provided at a lower portion of the element 13C is a main valve element 13Ca for controlling a flow of first coolant flowing through the main passage 13A, and provided at an upper portion of the element 13C is a bypass valve element 13Cb for controlling a flow of first coolant flowing through the bypass passage 13B. The element 13C has an internal space, and includes a diaphragm 13Cc by which the internal space is divided into two spaces, a piston 13Cd, and a plunger 13Ce connected to the piston 13Cd. Wax is filled within one internal space of the element 13C that is divided by the diaphragm 13Cc, so as to expand/contract based on the temperature of the first coolant, and liquid is filled within the other internal space of the element 13C, so as to transmit the expansion/contraction of the wax to the piston 13Cd. The heat regulator 13 also includes a press spring 13D for downwardly pressing the element 13C.

In this heat regulator 13, the inlet of the main passage 13A is connected to the first coolant passage (first circulating passage 11) extending from the heat exchanger 3, and the outlet of the main passage 13A is connected to the first coolant passage (first circulating passage 11) extending toward the fuel cell FC. The inlet of the bypass passage 13B is connected to the bypass line 11A. At the downstream of the element 13C (the main valve element 13Ca and the bypass valve element 13Cb) and within the heat regulator 13, the bypass passage 13B and the main passage 13A are joined together. Therefore, the outlet of the bypass passage 13B also functions as the outlet of the main passage 13A. Operation of the heat regulator 13 will be described below.

Figure 2:
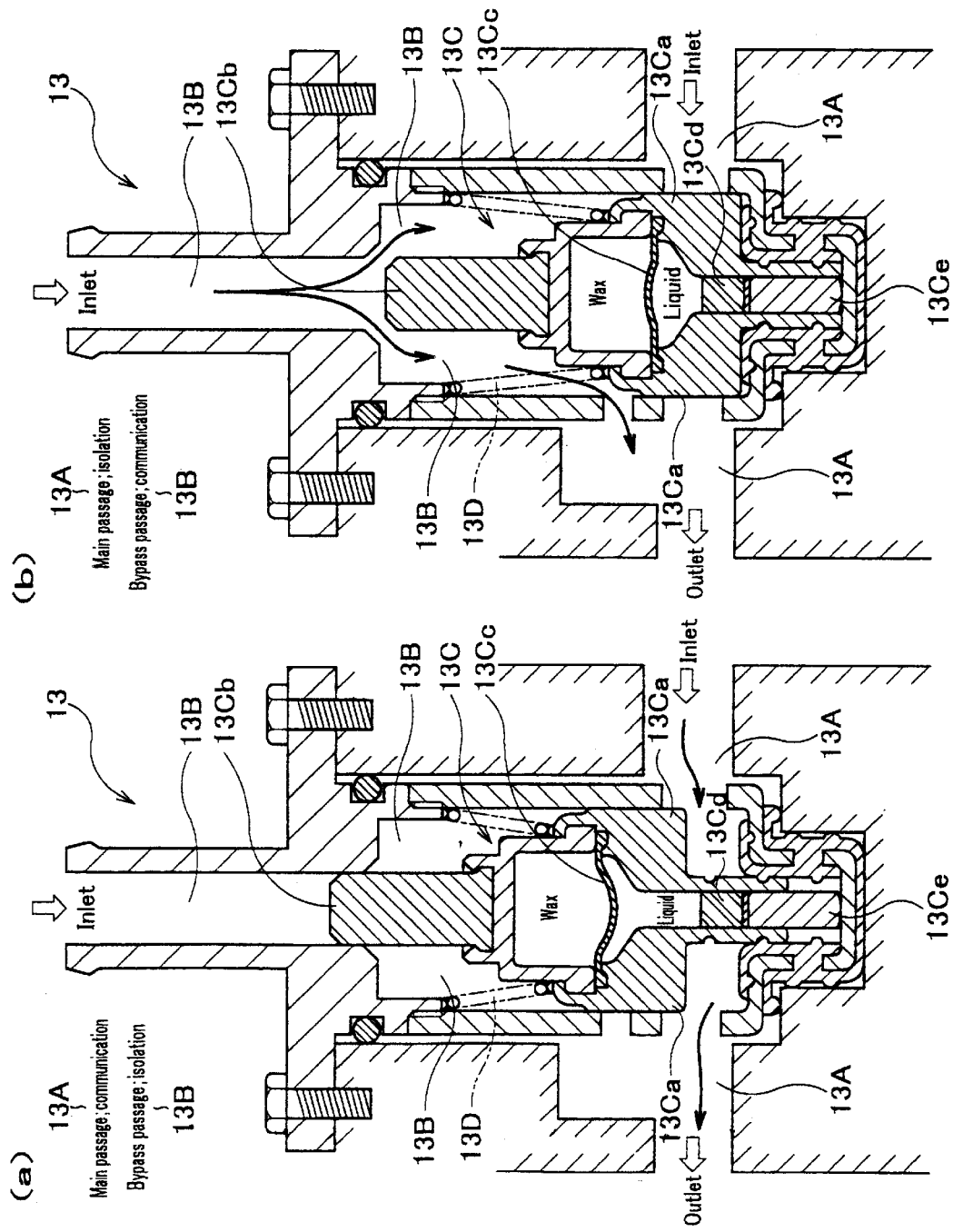
FIG. 2 is a cross sectional view illustrating the structure and operation of the heat regulator of FIG. 1, herein (a) shows an instance where a main passage is in communication while a bypass passage is shut off, and (b) shows an instance where the main passage is shut off while the bypass passage is in communication.

When the temperature of the first coolant is high, as shown in FIG. 2(a), the wax expands. The plunger 13Ce then protrudes from the main body of the element 13C against the pressing force of the press spring 13D, and pushes the element 13C (i.e. the main valve element 13Ca and the bypass valve element 13Cb) upward.

Therefore, the main valve element 13Ca opens the main passage 13A, and the bypass valve element 13Cb closes the bypass passage 13B. In this state, only cold first coolant that has flowed through the heat exchanger 3 is supplied to the fuel cell FC through the heat regulator 13 (see the thick arrow in the drawing). With continuation of this state, a flow of cold first coolant from the heat exchanger 3 cools the wax and which causes the wax to gradually contract, so that the plunger 13Ce gradually retracts into the main body of the element 13C under the pressing force of the press spring 13D. The element 13C gradually moves downward. Accordingly, the flow of cold first coolant from the heat exchanger 3 gradually decreases, while a flow of warm first coolant from the by pass line 11A gradually increases. The temperature of first coolant that has flowed through the heat regulator 13 gradually increases (temperature adjustment action at lower temperatures of first coolant).

On the contrary, when the temperature of first coolant is low, as shown in FIG. 2(b), the wax contracts. The plunger 13Ce then retracts into the main body of the element 13C by the pressing force of the press spring 13D, and depresses the element 13C (i.e. the main valve element 13Ca and the bypass valve element 13Cb) downward.

Therefore, the main valve element 13Ca closes the main passage 13A, and the bypass valve element 13Cb opens bypass passage 13B. In this state, only warm first coolant that has flowed through the bypass line 11A is supplied to the fuel cell FC through the heat regulator 13 (see the thick arrow in the drawing). With continuation of this state, a flow of warm first coolant from the bypass line 11A heats the wax, causing the wax to gradually expand, so that the plunger 13Ce gradually protrudes from the main body of the element 13C against the pressing force of the press spring 13D. As a result, the element 13C gradually moves upward. Accordingly, the flow of warm first coolant from the bypass line 11A gradually decreases, while a flow of cold first coolant from the heat exchanger 3 gradually increases. The temperature of first coolant that has flowed through the heat regulator 13 gradually decreases (temperature adjustment action at elevated temperatures of first coolant).

As described above, the heat regulator 13 increases the ratio of cold first coolant upon increasing the temperature of first coolant that flows inside of the heat regulator 13, or, on the contrary, increases the ratio of warm first coolant upon decreasing the temperature of first coolant that flows inside of the heat regulator 13, so as to adjust the temperature of first coolant to be supplied to the fuel cell FC in the range of a constant temperature range (approximately 70±2° C.).

An ion exchanger 14 is provided in the first circulating passage 11. The ion exchanger 14 utilizes ion exchangeres in which removes various ions from first coolant. The first circulating passage 11 also includes a first supply line 11B1 through which a part of first coolant flows from the downstream of the heat regulator 13 and the upstream of the fuel cell FC to the ion exchanger 14, a second supply line 11B2 through which a part of first coolant flows from the upstream of the heat regulator 13 and the downstream of the heat exchanger 3 to the ion exchanger 14, and a return line 11C through which first coolant that has flowed through the ion exchanger 14 returns to the intake side of the first circulating pump 12. A first solenoid valve SV1 is arranged in the first supply line 11B1 for shutting off/communicating the first supply line 11B1, and the second solenoid valve SV2 is arranged in the second supply line 11B2 for shutting off/communicating the second supply line 11B2. In this preferred embodiment, the supply control means essentially consists of the first supply line 11B1, the second supply line 11B2, the first solenoid valve SV1, the second solenoid valve SV2, and a controller CU to be described later.

In order to prevent liquid junction, the first cooling passage 1 and equipment provided in the first cooling passage 1 are made from corrosion resistant material, such as stainless steel, resin material, and resin-lining metallic material. Pure water (if necessary, mixed with antifreezing solution such as ethylene glycol) or thermal oil is used as first coolant. In a preferred embodiment, a mixture of pure water and ethylene glycol is used.

A temperature sensor T for detecting the temperature of first coolant is provided in the first circulating passage 11 at the downstream of the heat regulator 13 and at the upstream of the fuel cell FC.

The controller CU is provided in the first circulating passage 11. In response to the input of the detection signal from the temperature sensor T, the controller CU operates such that (1) when the temperature of first coolant is equal to or lower than the predetermined temperature (72° C.), the first solenoid valve SV1 is shut off and the second solenoid valve SV2 allows fluid communication, and (2) when the temperature of first coolant is beyond the predetermined temperature, the first solenoid valve SV1 allows fluid communication and the second solenoid valve SV2 is shut off.

The predetermined temperature is set to be the highest temperature (72° C.) of the temperature adjustable range at the heat regulator 13, and when the temperature of first coolant is beyond the temperature adjustable range of the heat regulator 13, the amount of cold first coolant supplied to the heat regulator 13 increases.

Second Cooling Passage

In order to cool the first cooling passage 1, a second circulating passage 21 for circulating and supplying second coolant to the heat exchanger 3 is formed in the second cooling passage 2. This second circulating passage 21 is equipped with a second circulating pump 22 for circulating second coolant, and a radiator 23 for cooling the second cooling passage 2 (second coolant).

The radiator 23 may be of known general type such as used for vehicles. Second coolant may be the same as first coolant. In this preferred embodiment, a mixture of pure water and ethylene glycol is used.

Fuel Cell

The fuel cell FC of an embodiment of the invention is a PEM type fuel cell, in which an electrolyte membrane is sandwiched between oxygen and hydrogen poles to form an electrode assembly (MEA) and the resultant assembly is clamped between separators to produce a single cell, and finally approximately 200 single cells are pilled up for a laminate structure. Each separator has a passage for first coolant by which the fuel cell FC is cooled and operates at appropriate temperatures. Herein, PEM stands for Proton Exchange Membrane, and MEA stands for Membrane Electrode Assembly.

Operation of Cooling System for Fuel Cell

Figure 3:
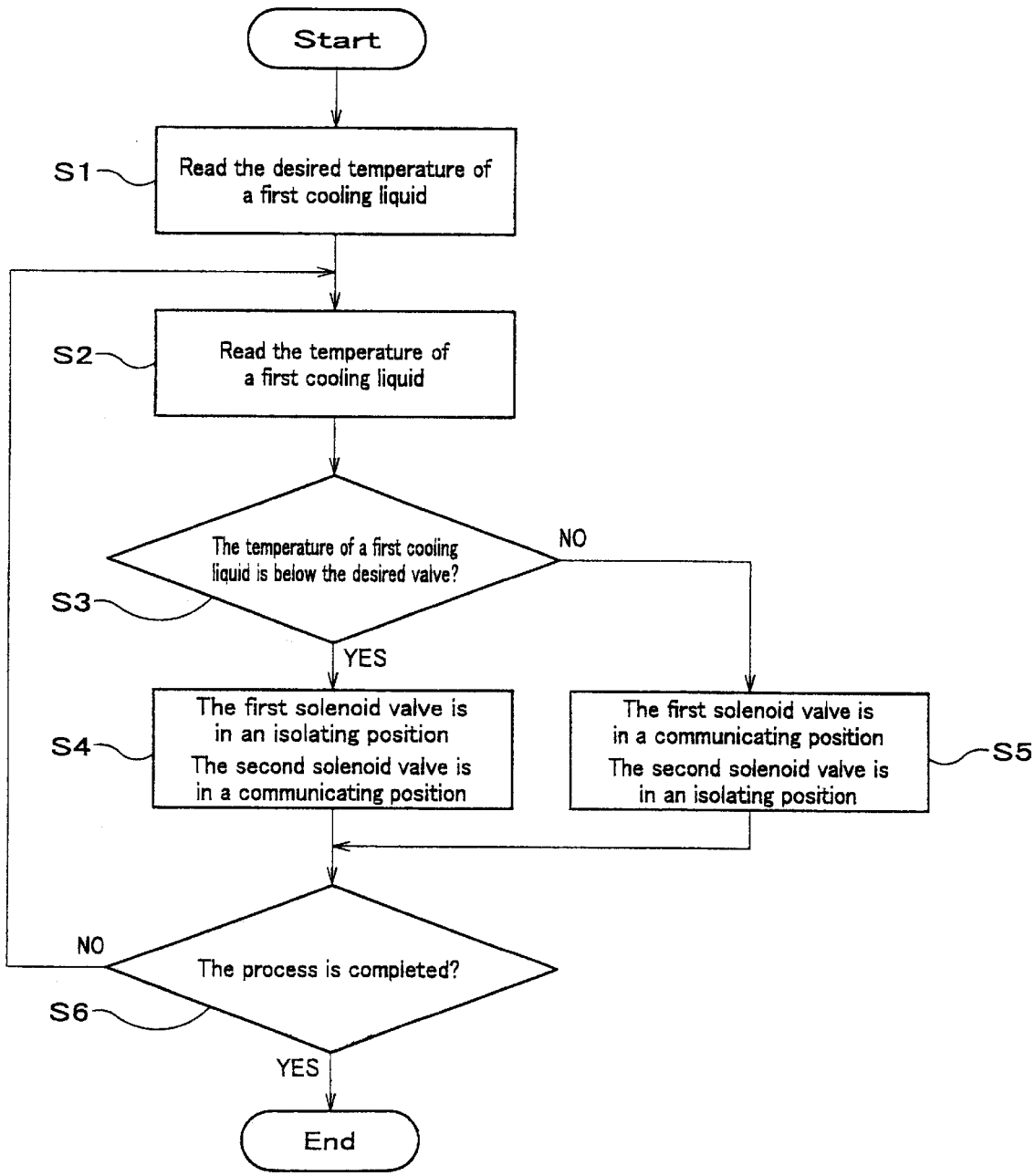
FIG. 3 is a flow chart explaining the operation when a first coolant is supplied to the ion exchanger of FIG. 1.
Figure 4:
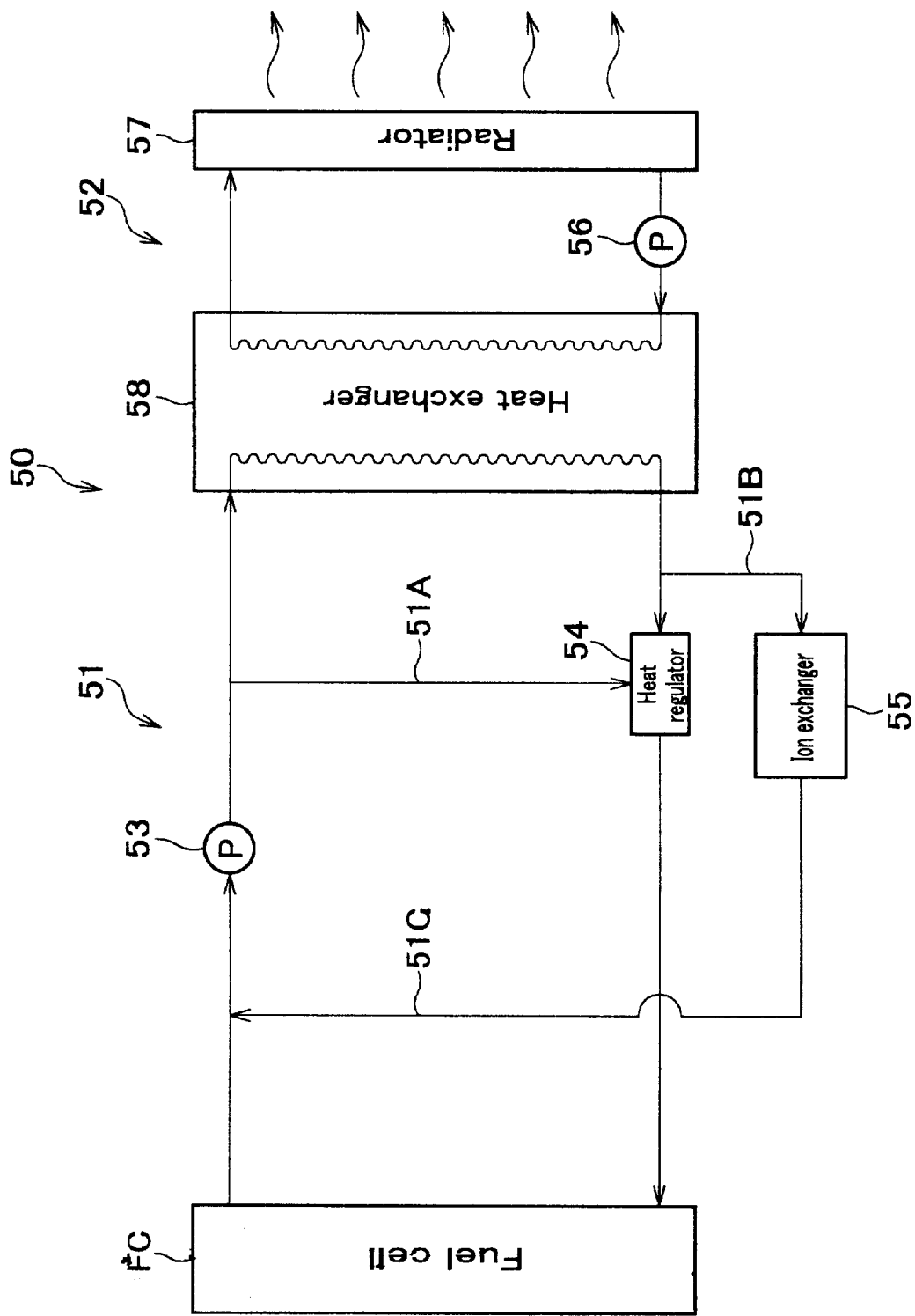
FIG. 4 is a block diagram illustrating the structure of a conventional cooling system for a fuel cell.

With reference to FIG. 3, operation of the previously described cooling system M will be described.

When the cooling system M actuates, the first circulating pump 12 in the first cooling passage 1 and the second circulating pump 22 in the second cooling passage 2 starts to operate, so that first coolant circulates through the first cooling passage and second coolant circulates through the second cooling passage 2. Heat generated by the fuel cell FC is transmitted first to the first coolant, then the heat exchanger 3, the second coolant, and the radiator 23, after which the heat is finally discharged to the outside air.

In the first cooling passage 1, cold first coolant flowing through the heat exchanger 3 and warm first coolant bypassing the heat exchanger 3 are mixed together at the heat regulator 13. The heat regulator 13 adjusts the temperature of first coolant within a constant temperature range (70±2° C.) and then supplies it to the fuel cell FC.

In the first cooling passage 1, a part of first coolant is supplied to the ion exchanger 14 either through the first supply line 11B1 or the second supply line 11B2. First coolant from which ions have been removed by the ion exchanger 14 returns to the intake side of the first circulating pump 12 through the return line 11C.

With reference to the flow chart of FIG. 3, operation (of the controller CU) for supplying the ion exchanger 14 with first coolant will be described.

As shown in FIG. 3, the target temperature of first coolant is read in step S1. The target temperature indicates the highest temperature of the temperature adjustable range at the heat regulator 13, that is, the predetermined temperature (72° C.) to be described previously. Next, the temperature of first coolant detected by the temperature sensor T is read in step S2. In step S3, a determination is made as to whether the temperature of first coolant is equal to or lower than the target temperature.

When the temperature of first coolant is equal to or lower than the target temperature (YES), such as in the case of actuation or normal operation of the fuel cell FC, it is determined that the temperature of first coolant is not beyond the temperature adjustable range of the heat regulator 13. In step S4, the solenoid valve SV1 is switched to the shut off position, and the second solenoid valve SV2 is switched to the communicating position. Therefore, cold first coolant (before flowing through the heat regulator 13) that has flowed through the heat exchanger 3 is supplied to the ion exchanger 14 through the second supply line 11B2. This allows the ion exchanger 14 to be used under favorable conditions.

During the normal operation, in which the fuel cell FC is driven under the normal condition, cold first coolant that has flowed through the heat exchanger 3 is supplied to the ion exchanger 14, mostly according to step S4. During the warm-up of the fuel cell FC just after the actuation, the heat regulator 13 is in the operating condition shown in FIG. 2(b), and first coolant that has flowed through the bypass line 11A is supplied to the fuel cell FC. Therefore, warming-up of the fuel cell FC can be performed rapidly.

Meanwhile, when the temperature of first coolant is beyond the target temperature (NO), such as in the case of increased combustion heat of the fuel cell FC, it is determined that the temperature of first coolant is beyond the temperature adjustable range of the heat regulator 13. In step S5, the first solenoid valve SV1 is switched to the communicating position, and the second solenoid valve SV2 is switched to the shut off position. Therefore, first coolant after temperature adjustment that has flowed through the heat regulator 13 is supplied to the ion exchanger 14 through the first supply line 11B1.

To be more specific, when the temperature of the first coolant exceeds the target temperature (beyond the temperature adjustable range of the heat regulator 13), cold first coolant that has flowed through the heat exchanger 3 is insufficient at the heat regulator 13. In other words, although the heat regulator 13 operates such that the bypass passage 13B is shut off and the main passage 13A is in fluid communication as illustrated in FIG. 2(a), cold first coolant is insufficient and the temperature of first coolant to be supplied to the fuel cell FC becomes higher than the target temperature.

In this event, in order to increase the amount of cold first coolant to be supplied to the heat regulator 13, the controller CU operates such that the first solenoid valve SV1 is switched to the communicating position and the second solenoid valve SV2 is switched to the shut off position. This can prevent cold first coolant from flowing away from the upstream of the heat regulator 13, and by this increased cold first coolant the heat regulator 13 adjusts the temperature of first coolant to be supplied to the fuel cell FC equal to or lower than the target temperature.

In this instance, after the heat regulator 13 adjusts the temperature of first coolant, the first coolant is supplied to the ion exchanger 14. However, such an instance occurs in a considerably short period of time against the total driving time of the fuel cell FC, and only a little influence may affect on the service life of the ion exchange resin of the ion exchanger 14. Therefore, it is more advantageous that an appropriate temperature of first coolant is supplied to the fuel cell FC by the result of temperature adjustment of the first coolant in a priority manner.

In step S6, a determination is made as to whether the process is completed. If the process is not completed, operation returns to step S2 to execute various processing. The process is completed, for example, when the operation of the cooling system M is stopped.

While the present invention has been described in detail with reference to a specific embodiment thereof, it will be apparent to one skilled in the art that various changes and modifications may be made without departing from the scope of the claims.

For example, a cooler for decreasing the temperature of the first coolant may be arranged in the first supply line. Instead of the arrangement where the supply control means consists of the first solenoid valve, the second solenoid valve, and the like, butterfly valves each driven by a stepping motor may be used for varying the flow rate of first coolant. The supply control means may also include a three way valve. Further, if the heat exchanger also functions as a radiator, the second cooling passage may be omitted.

What is claimed is:

1. A cooling system for a fuel cell comprising:
   a heat exchanger which cools coolant discharged from the fuel cell;
   a heat regulator which adjusts a temperature of coolant to be supplied to the fuel cell after mixing together coolant that has been cooled by the heat exchanger and coolant that has bypassed the heat exchanger;
   an ion exchanger which removes ions from coolant with the use of an ion exchange resin; and
   a supply control means which controls coolant to be supplied to the ion exchanger, wherein the supply control means supplies the ion exchanger with coolant from downstream of the heat regulator when the heat regulator operates beyond a coolant temperature adjustable range, and wherein the supply control means supplies the ion exchanger with coolant that has been cooled by the heat exchanger from upstream of the heat regulator when the heat regulator operates within the coolant temperature adjustable range.

2. A cooling system for a fuel cell according to claim 1, further comprising a temperature detector for detecting a temperature of coolant to be supplied to the fuel cell, and wherein the supply control means supplies the ion exchanger with coolant that has bypassed the heat exchanger when the temperature of the coolant is equal to or lower than a predetermined temperature, and wherein the supply control means supplies the ion exchanger with coolant that has been cooled by the heat exchanger when the temperature of the coolant is higher than the predetermined temperature.

3. A cooling system for a fuel cell according to claim 1 wherein the supply control means includes a first supply line extending from the downstream of the heat regulator to the ion exchanger, a first solenoid valve provided in the first supply line, a second supply line extending from the upstream of the heat regulator to the ion exchanger, a second solenoid valve provided in the second supply line, and a controller for switching the first solenoid valve and the second solenoid valve between communicating and shut off positions.

4. A cooling system for a fuel cell according to claim 2, wherein the supply control means includes a first supply line extending from the downstream of the heat regulator to the ion exchanger, a first solenoid valve provided in the first supply line, a second supply line extending from the upstream of the heat regulator to the ion exchanger, a second solenoid valve provided in the second supply line, and a controller for switching the first solenoid valve and the second solenoid valve between communicating and shut off positions.

5. A cooling system for a fuel cell according to claim 3 wherein the controller controls the first and second solenoid valves such that one of the two solenoid valves is in the communicating position and the other one of the two solenoid valve is in the shut off position.

6. A cooling system for a fuel cell according to claim 4 wherein the controller controls the first and second solenoid valves such that one of the two solenoid valves is in the communicating position and the other one of the two solenoid valve is in the shut off position.

7. A cooling system for a fuel cell according to claim 1, wherein the heat regulator includes a main passage through which coolant from the heat exchanger flows, and a bypass passage through which coolant bypassing the heat exchanger flows, and wherein the heat regulator automatically adjusts rate of flows between coolant that flows through the main passage and coolant that flows through the bypass passage.

8. A cooling system for a fuel cell according to claim 2 wherein the heat regulator includes a main passage through which coolant from the heat exchanger flows, and a bypass passage through which coolant bypassing the heat exchanger flows, and wherein the heat regulator automatically adjusts rate of flows between coolant that flows through the main passage and coolant that flows through the bypass passage.

9. A cooling system for a fuel cell according to claim 3, wherein the heat regulator includes a main passage through which coolant from the heat exchanger flows, and a bypass passage through which coolant bypassing the heat exchanger flows, and wherein the heat regulator automatically adjusts rate of flows between coolant that flows through the main passage and coolant that flows through the bypass passage.

10. A cooling system for a fuel cell according to claim 4 wherein the heat regulator includes a main passage through which coolant from the heat exchanger flows, and a bypass passage through which coolant bypassing the heat exchanger flows, and wherein the heat regulator automatically adjusts rate of flows between coolant that flows through the main passage and coolant that flows through the bypass passage.

11. A cooling system for a fuel cell according to claim 5 wherein the heat regulator includes a main passage through which coolant from the heat exchanger flows, and a bypass passage through which coolant bypassing the heat exchanger flows, and wherein the heat regulator automatically adjusts rate of flows between coolant that flows through the main passage and coolant that flows through the bypass passage.

12. A cooling system for a fuel cell according to claim 4 wherein the heat regulator includes a main passage through which coolant from the heat exchanger flows, and a bypass passage through which coolant bypassing the heat exchanger flows, and wherein the heat regulator automatically adjusts rate of flows between coolant that flows through the main passage and coolant that flows through the bypass passage.

13. A cooling system for a fuel cell comprising:
a heat exchanger which cools coolant discharged from the fuel cell;
a heat regulator which adjusts a temperature of coolant to be supplied to the fuel cell after mixing together coolant that has been cooled by the heat exchanger and coolant that has bypassed the heat exchanger;
an ion exchanger which removes ions from coolant with the use of an ion exchange resin;
a first valve disposed between an inlet to the ion exchanger and a downstream side of the heat regulator;
a second valve disposed between the inlet to the ion exchanger and an upstream side of the heat exchanger;
a supply control means which controls the first and second valves to control a supply of coolant to the ion exchanger, wherein the supply control means opens the first valve and closes the second valve when the temperature of coolant downstream of the heat regulator exceeds a predetermined range, and wherein the supply control means closes the first valve and opens the second valve when the temperature of coolant downstream of the heat regulator is within the predetermined range.

14. A cooling system for a fuel cell which discharges coolant through a discharge line and is supplied coolant through a supply line comprising:
a heat exchanger for cooling a first portion of the coolant from the discharge line;
a heat regulator for adjusting a temperature of the coolant in the supply line by mixing together the first portion of the coolant from the discharge line that has been cooled by the heat exchanger and a second portion of coolant from the discharge line that has bypassed the heat exchanger;
an ion exchanger for removing ions from coolant with the use of an ion exchange resin; and
a supply control means for controlling flow to the ion exchanger, wherein the supply control means supplies the ion exchanger with a mixture of the first portion of coolant and the second portion of coolant from downstream of the heat regulator when the heat regulator operates beyond a coolant temperature adjustable range, and wherein the supply control means supplies the ion exchanger with a fraction of the first portion of coolant that has been cooled by the heat exchanger from upstream of the heat regulator when the heat regulator operates within the coolant temperature adjustable range.

* * * * *